(12) United States Patent
Na et al.

(10) Patent No.: US 11,046,316 B2
(45) Date of Patent: Jun. 29, 2021

(54) REGENERATIVE BRAKING CONTROL METHOD OF HYBRID VEHICLE

(71) Applicants: HYUNDAI MOTOR COMPANY, Seoul (KR); KIA MOTORS CORPORATION, Seoul (KR)

(72) Inventors: Sung Chan Na, Seongnam-si (KR); Seong Hwan Cheong, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 278 days.

(21) Appl. No.: 16/395,827

(22) Filed: Apr. 26, 2019

(65) Prior Publication Data
US 2020/0180631 A1    Jun. 11, 2020

(30) Foreign Application Priority Data
Dec. 10, 2018    (KR) .................... 10-2018-0158666

(51) Int. Cl.
*B60W 30/18*    (2012.01)
*B60L 7/18*    (2006.01)
(Continued)

(52) U.S. Cl.
CPC ......... *B60W 30/18127* (2013.01); *B60L 7/18* (2013.01); *B60W 10/10* (2013.01);
(Continued)

(58) Field of Classification Search
CPC .......... B60W 30/18127; B60W 20/30; B60W 20/00; B60W 10/18; B60W 10/10;
(Continued)

(56) References Cited

U.S. PATENT DOCUMENTS 8,831,842 B2 * 9/2014 Dufford ................ B60W 20/30
701/54
9,120,483 B2 * 9/2015 Sato ........................ F16H 63/42
(Continued)

FOREIGN PATENT DOCUMENTS

KR    10-2015-0001546 A    1/2015
KR    10-1558712 A    10/2015

*Primary Examiner* — Ramsey Refai
(74) *Attorney, Agent, or Firm* — Morgan, Lewis & Bockius LLP

(57) ABSTRACT

A regenerative braking control method of a hybrid vehicle may include: a vehicle condition determination operation of determining, by a controller, whether a vehicle speed and a driving mode satisfy conditions suitable for regenerative braking control of the hybrid vehicle; an accumulated count increasing operation of increasing, by the controller, an accumulated count of a reduction direction signal when the reduction direction signal is input from a two-way input device while the conditions are satisfied; an accumulated count reducing operation of reducing, by the controller, the accumulated count of the reduction direction signal depending on a count of the increase direction signal when the increase direction signal is input from the two-way input device while the conditions are satisfied; and a phased braking operation of increasing, by the controller, regenerative braking torque of a motor in phases depending on the accumulated count of the reduction direction signal.

10 Claims, 6 Drawing Sheets

(51) Int. Cl.
*B60W 20/30* (2016.01)
*B60W 20/00* (2016.01)
*B60W 10/18* (2012.01)
*B60W 10/10* (2012.01)

(52) U.S. Cl.
CPC ............ *B60W 10/18* (2013.01); *B60W 20/00* (2013.01); *B60W 20/30* (2013.01); *B60W 2520/10* (2013.01); *B60W 2530/00* (2013.01); *B60W 2710/1005* (2013.01); *B60W 2710/18* (2013.01); *B60Y 2300/18125* (2013.01); *B60Y 2300/70* (2013.01); *B60Y 2400/81* (2013.01)

(58) Field of Classification Search
CPC ......... B60W 2530/00; B60W 2710/18; B60W 2710/1005; B60W 2520/10; B60L 7/18; B60Y 2400/81; B60Y 2300/18125; B60Y 2300/70

See application file for complete search history.

(56) References Cited

U.S. PATENT DOCUMENTS

| | | | |
|---|---|---|---|
| 10,124,677 B2* | 11/2018 | Murase | B60L 7/14 |
| 2003/0062770 A1* | 4/2003 | Sasaki | B60T 13/662 |
| | | | 303/152 |
| 2007/0241611 A1* | 10/2007 | Shimada | B60L 7/00 |
| | | | 303/152 |
| 2015/0006039 A1* | 1/2015 | Hyun | B60W 10/11 |
| | | | 701/48 |
| 2016/0257297 A1* | 9/2016 | Oshiumi | B60L 15/20 |
| 2017/0247027 A1 | 8/2017 | Nefcy et al. | |

* cited by examiner

REGENERATIVE BRAKING CONTROL METHOD OF HYBRID VEHICLE

CROSS REFERENCE TO RELATED APPLICATION

The present application claims priority to Korean Patent Application No. 10-2018-0158666 filed on Dec. 10, 2018, the entire contents of which is incorporated herein for all purposes by this reference.

BACKGROUND OF THE DISCLOSURE

Field of the Disclosure

The present invention relates to a regenerative braking control method of a hybrid vehicle.

Description of Related Art

Generally, a hybrid vehicle may appropriately combine power generated from an engine and a motor and use the combined power as driving force of a vehicle, thus enhancing fuel efficiency of the vehicle.

Therefore, a motor which is disposed in hybrid vehicles has a comparatively small capacity, compared to that of a motor which is disposed in a pure electric vehicle.

On the one hand, in conventional vehicles, regardless of a gearshift lever, a separate paddle shift may be mounted on a steering wheel to allow a driver to easily perform a manual gear shifting operation without removing his or her hand from a steering wheel. In terms of vehicles, except the gearshift lever, the paddle shift may be regarded as being a kind of two-way input device configured for receiving two-way manipulation force such as force for increasing or reducing the gear stage by the driver.

Hereinafter, in the present invention, the term 'two-way input device' is a device other than the gearshift lever, and means an arbitrary input device configured to receive opposite two-way requests of an increase or a reduction in stages of a target such as the gear stages by the driver.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a regenerative braking control method of a hybrid vehicle which may control regenerative braking of a vehicle through a two-way input device even when the hybrid vehicle is under coasting conditions, embody phased changes of regenerative braking force corresponding to a control input of the two-way input device, and maximize a realizable regenerative braking rate, thus enhancing fuel efficiency of the vehicle.

According to one aspect, there is provided a regenerative braking control method of a hybrid vehicle, including: a vehicle condition determination operation of determining, by a controller, whether a vehicle speed and a driving mode satisfy conditions suitable for regenerative braking control of the hybrid vehicle; an accumulated count increasing operation of increasing, by the controller, an accumulated count of a reduction direction signal when the reduction direction signal is input from a two-way input device while the conditions suitable for the regenerative braking control are satisfied; an accumulated count reducing operation of reducing, by the controller, the accumulated count of the reduction direction signal depending on a count of the increase direction signal when the increase direction signal is input from the two-way input device while the conditions suitable for the regenerative braking control are satisfied; and a phased braking operation of increasing, by the controller, regenerative braking torque of a motor in phases depending on the accumulated count of the reduction direction signal. When the phased braking operation is performed, the controller may perform a gear shifting operation using different gear shifting patterns depending on the accumulated count of the reduction direction signal.

The conditions suitable for the regenerative braking control in the vehicle condition determination operation may be satisfied when the vehicle speed is equal to or greater than a predetermined creep-regeneration reference speed and the driving mode is a fuel efficiency mode.

In the accumulated count increasing operation, the accumulated count of the reduction direction signal may be increased only to a predetermined maximum reference count, and accumulated count of the reduction direction signal is after the accumulated count of the reduction direction signal reaches the predetermined maximum reference count, the accumulated count of the reduction direction signal is maintained at the predetermined maximum reference count.

In the accumulated count reducing operation, the accumulated count of the reduction direction signal may be reduced only to a predetermined minimum reference count, and after the accumulated count reaches the predetermined minimum reference count, the accumulated count may be maintained at the predetermined minimum reference count.

The predetermined minimum reference count may be set to 0. In the phased braking operation, when the accumulated count of the reduction direction signal is a value of the predetermined minimum reference count+1, a first gear shifting pattern which is identical with a gear shifting pattern which is used when the accumulated count of the reduction direction signal is the predetermined minimum reference count may be used. When the accumulated count of the reduction direction signal is the predetermined maximum reference count or a value of the predetermined maximum reference count −1, a second gear shifting pattern different from the first gear shifting pattern may be used in common.

In the second gear shifting pattern, the gear shifting operation between all gear stages may be set such that down shifts are performed at vehicle speeds higher than vehicle speeds at which down shifts of the first gear shifting pattern are performed.

In the phased braking operation, the gear shifting operation may be performed in a gear shifting pattern set such that, as the accumulated count of the reduction direction signal is increased, vehicle speeds at which down shifts are performed are increased.

The two-way input device may be formed of a paddle shift. When the driving mode of the vehicle is a driving mode set to preferentially receive gear shifting requirement of a driver, the controller may be configured to determine a reduction direction signal of the two-way input device as a down shift signal of a transmission, and determine an increase direction signal as an up shift signal of the transmission.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
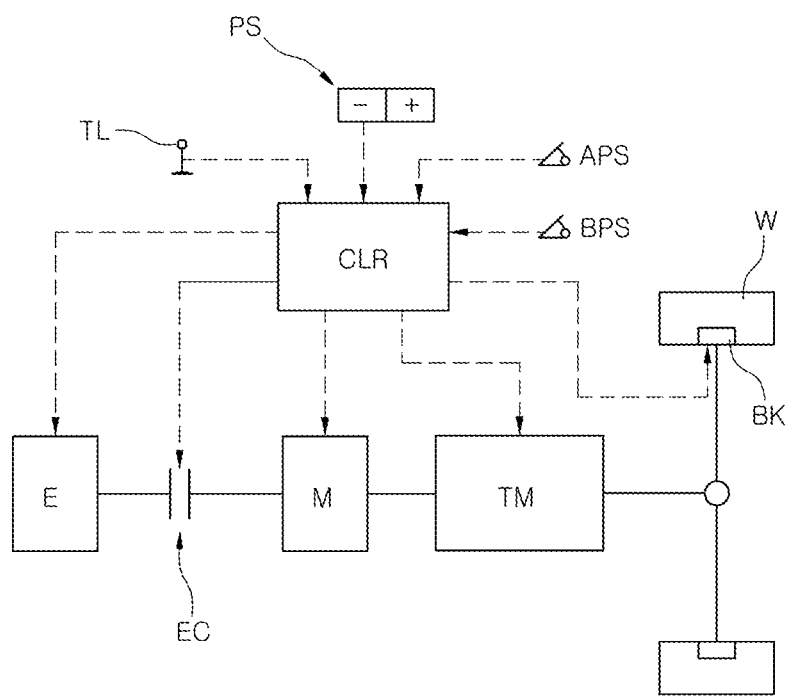
FIG. 1 is a diagram illustrating the configuration of a hybrid vehicle to which the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a diagram illustrating an example of a hybrid vehicle to which the present invention may be applied. A motor M is disposed on an input shaft of a transmission TM, and an engine clutch EC is provided between an engine E and the motor M. Thus, when the hybrid vehicle travels in an electric vehicle mode or a regenerative braking operation is performed, the engine E may be disconnected from driving wheels W.

The controller CLR may be configured to control the engine E, the motor M, the transmission TM, the engine clutch EC, etc., and may be configured to not only control the regenerative braking operation by the motor M but also control mechanical braking force by controlling a brake BK.

Of course, substantially, the controller CLR may be configured as various control units such as an engine control unit (ECU), a transmission control unit (TCU), and a hybrid control unit (HCU), but in the exemplary embodiment, it is expressed as a single controller for conceptual simplification.

The controller CLR may receive, using an accelerator position sensor (APS), an extent to which a driver presses an accelerator pedal, may receive, using a brake position sensor (BPS), an extent to which the driver presses a brake pedal, and may receive a manipulation signal from a paddle shift (PS) which is a two-way input device.

Furthermore, the controller CLR may be configured to receive vehicle driving-related information such as a vehicle speed or a driving mode selected by manipulating a gearshift lever TL.

Figure 2:
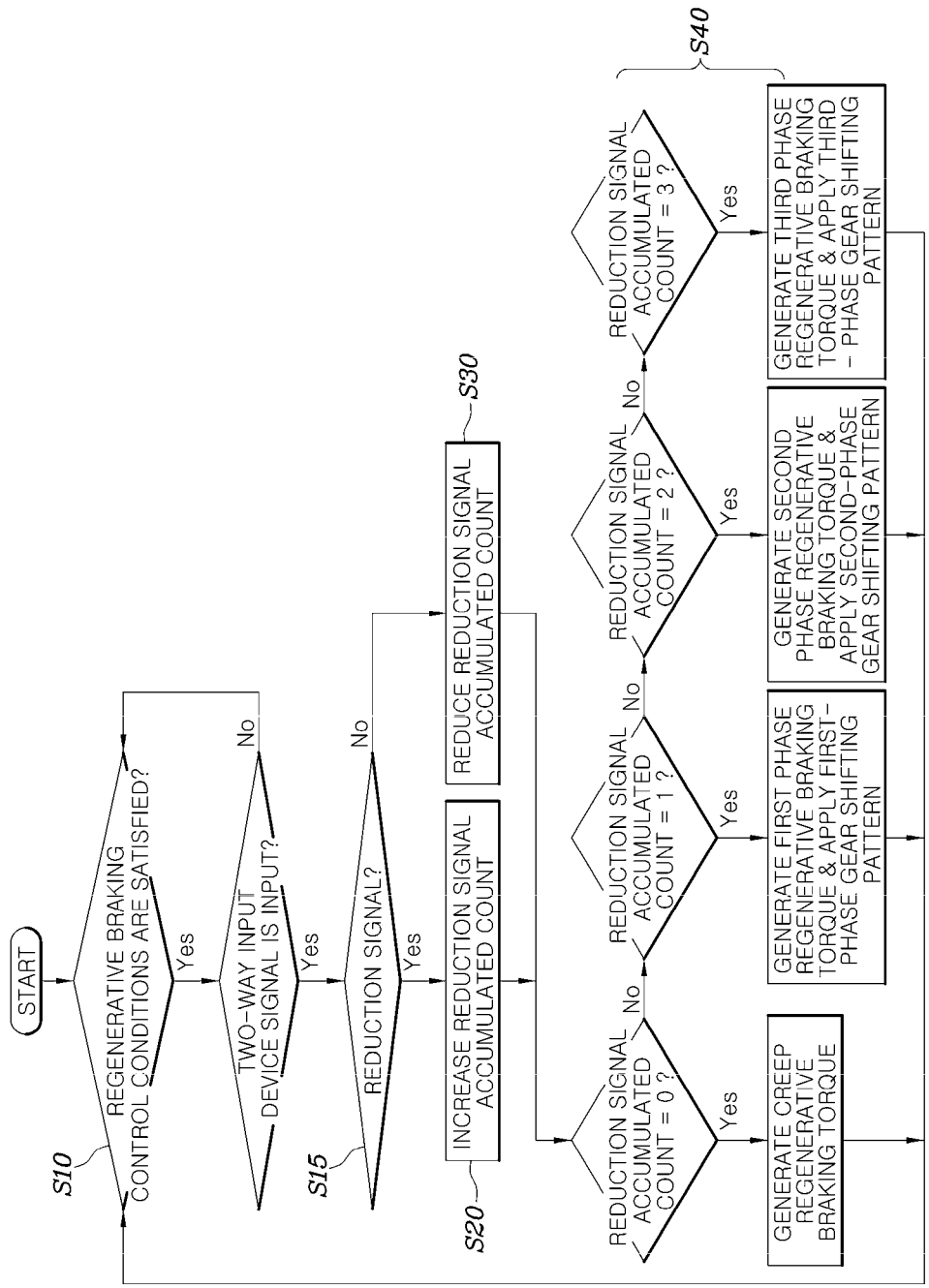
FIG. 2 is a flowchart illustrating an exemplary embodiment of a regenerative braking control method of a hybrid vehicle according to an exemplary embodiment of the present invention.

Referring to FIG. 2, a regenerative braking control method of a hybrid vehicle according to an exemplary embodiment of the present invention may include: a vehicle condition determination step S10 of determining whether the vehicle speed and the driving mode satisfy conditions suitable for regenerative braking control of the hybrid vehicle; an accumulated count increasing step S20 of increasing, by the controller, an accumulated count of a reduction direction signal when the reduction direction signal is input from the two-way input device at S15 while the conditions suitable for the regenerative braking control are satisfied; an accumulated count reducing step S30 of reducing, by the controller, the accumulated count of the reduction direction signal depending on a count of the increase direction signal when the increase direction signal is input from the two-way input device at S15 while the conditions suitable for the regenerative braking control are satisfied; and a phased braking step S40 of increasing, by the controller, regenerative braking torque of the motor M in phases depending on the accumulated count of the reduction direction signal. When the phased braking step S40 is performed, the controller performs a gear shifting operation using different gear shifting patterns depending on the accumulated count of the reduction direction signal.

In other words, in an exemplary embodiment of the present invention, under the conditions suitable for the regenerative braking control, when a reduction direction signal is input by the two-way input device, a gear shifting operation is performed using different gear shifting patterns which are used as criteria along which, in a response to the count of the input of the reduction direction signal, not only may regenerative braking torque of the motor M be generated, but the gear shifting operation may also be performed in the transmission TM. Therefore, the driver may easily adjust a regenerative braking rate in phases by manipulating the two-way input device. Here, the regenerative braking rate may be maximized by differential application of the gear shifting patterns, thus contributing to improvement in the fuel efficiency of the vehicle.

The conditions suitable for the regenerative braking control at the vehicle condition determination step S10 are satisfied when the vehicle speed is equal to or greater than a predetermined creep-regeneration reference speed and the driving mode is a fuel efficiency mode.

In other words, in an exemplary embodiment of the present invention, even when the driver does not press the brake pedal, the conditions suitable for the regenerative braking control may be satisfied.

Therefore, even if the vehicle coasts because the driver presses neither the acceleration pedal nor the brake pedal, when the above-mentioned conditions of the vehicle speed and the driving mode are satisfied, the conditions suitable for the regenerative braking control are basically satisfied. Furthermore, when a reduction direction signal is input by the two-way input device, the motor M actively generates regenerative braking torque in a response to the input of the reduction direction signal so that the regeneration braking operation may be performed.

Figure 5:
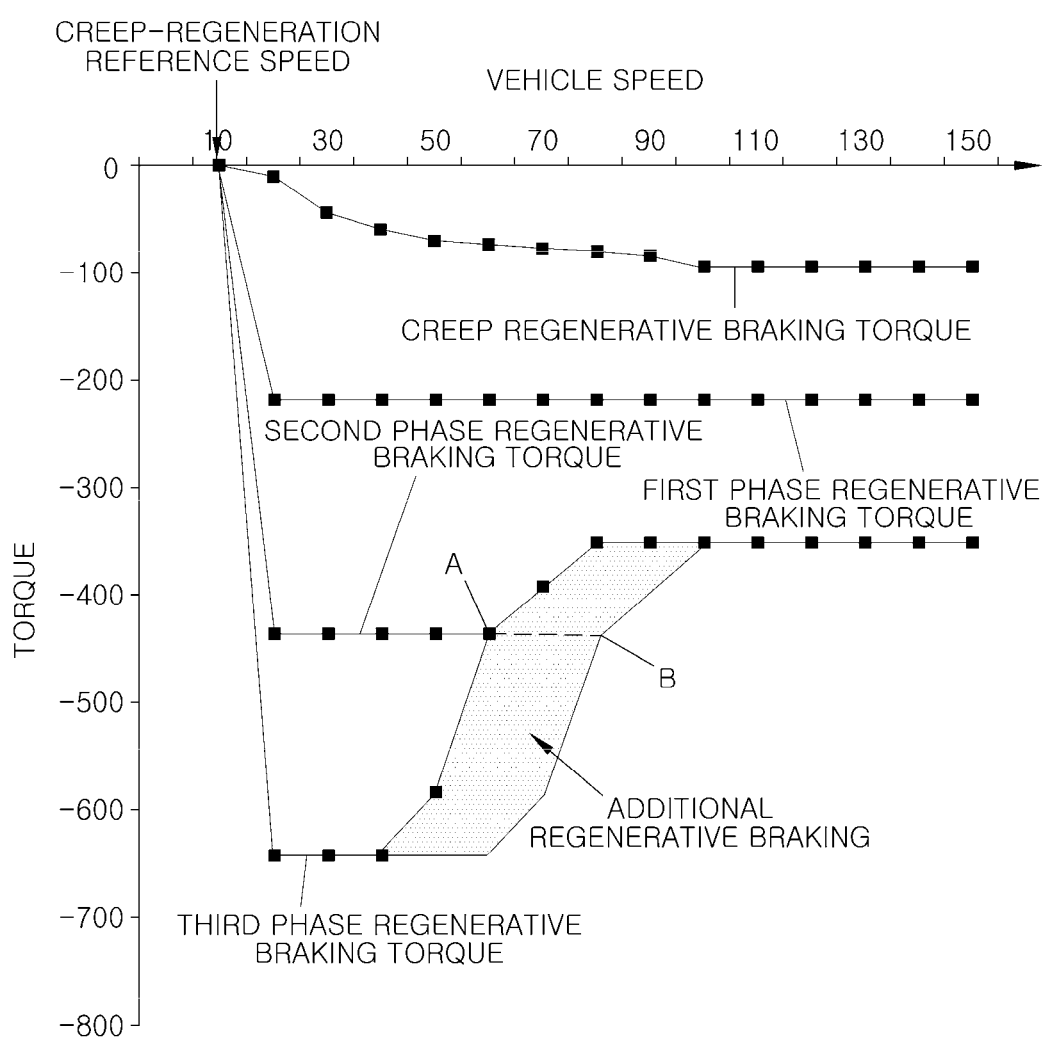
FIG. 5 is a map of a motor regenerative brake torque as a function of a vehicle speed according to an exemplary embodiment of the present invention.

Here, for example, referring to FIG. 5, the creep-regeneration reference speed may be set to approximately 10 kph, and mean a reference speed, based on which when the vehicle speed is the foregoing speed or greater, creep regenerative braking torque is generated such that the motor M performs the regenerative braking operation even when the vehicle is under coasting conditions, and when the vehicle speed is less than the foregoing speed, creep torque for driving the vehicle is generated from the motor M to maintain a speed required for creep driving of the vehicle.

On the one hand, the fuel efficiency mode may refer to a mode which is so-called "Economical mode" in which the vehicle is controlled to focus on improvement in fuel efficiency rather than acceleration performance of the vehicle. In other words, the fuel efficiency mode is a mode opposite to a so-called "SPORTS Mode" which is focused on improvement in acceleration performance.

At the accumulated count increasing step S20, the accumulated count of the reduction direction signal is increased only to a predetermined maximum reference count. After the accumulated count has reached the predetermined maximum reference count, it is maintained at the predetermined maximum reference count.

At the accumulated count reducing step S30, the accumulated count of the reduction direction signal is reduced only to a predetermined minimum reference count. After the accumulated count has reached the predetermined minimum reference count, it is maintained at the predetermined minimum reference count.

In other words, the predetermined maximum reference count is set so that, even if the driver continuously manipulates the two-way input device, the regenerative braking torque may be increased only to a stage determined by design rather than being continuously increased. For example, in an exemplary embodiment of the present invention, the predetermined maximum reference count may be set to 3.

On the one hand the predetermined minimum reference count may be set to 0.

The reason for this is because of the fact that, if the accumulated count of the reduction direction signal becomes 0, the regenerative braking control according to an exemplary embodiment of the present invention is not performed, so that even if an increase direction signal is further generated through the two-way input device, it is meaningless that the accumulated count of the reduction direction signal is less than 0.

For reference, a state in which the accumulated count of the reduction direction signal becomes 0 indicates that the driver is not intended to actively perform the regenerative braking control. At the instant time, as illustrated in FIG. 5, in the case where the vehicle speed is the creep-regeneration reference speed or greater, the motor M generates creep regenerative braking torque preset depending on the vehicle speed so that the regenerative braking operation is slightly performed.

In an exemplary embodiment of the present invention, at the phased braking step S40, when the accumulated count of the reduction direction signal is a value of the predetermined minimum reference count+1, a first gear shifting pattern which is identical with a gear shifting pattern which is used when the accumulated count of the reduction direction signal is the predetermined minimum reference count is used. When the accumulated count of the reduction direction signal is the predetermined maximum reference count or a value of the predetermined maximum reference count −1, a second gear shifting pattern different from the first gear shifting pattern is used in common.

Figure 3:
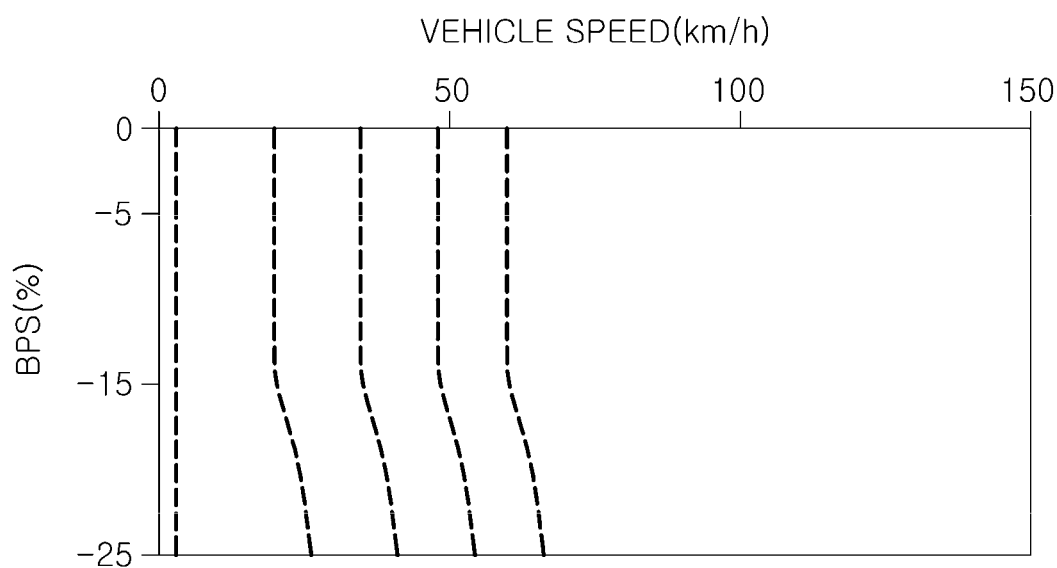
FIG. 3 is a diagram illustrating an example of a first gear shifting pattern according to an exemplary embodiment of the present invention.
Figure 4:
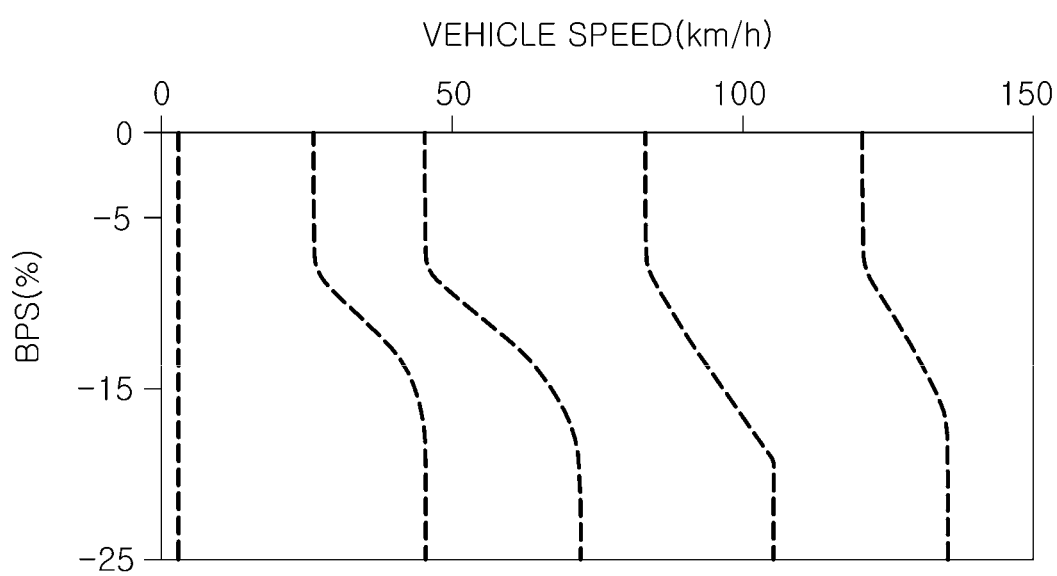
FIG. 4 is a diagram illustrating an example of a second gear shifting pattern according to an exemplary embodiment of the present invention.

In other words, as described in an exemplary embodiment of the present invention, in the case where the predetermined minimum reference count is 0 and the predetermined maximum reference count is 3, when the accumulated count of the reduction direction signal is 0 or 1, a gear shifting control operation of the transmission TM is performed in the first gear shifting pattern, as illustrated in FIG. 3. When the accumulated count of the reduction direction signal is 2 or 3, the gear shifting control operation is performed in the second gear shifting pattern, as illustrated in FIG. 4.

Here, in the second gear shifting pattern, the gear shifting operation between all gear stages is set such that down shifts are performed at vehicle speeds higher than those in the first gear shifting pattern.

In other words, at the phased braking step S40, the gear shifting operation is performed in a gear shifting pattern set such that, as the accumulated count of the reduction direction signal is increased, vehicle speeds at which down shifts are performed are increased.

Accordingly, in the case where, as the accumulated count of the reduction direction signal of the two-way input device is increased, the vehicle speeds at which the down shifts are performed are increased, additional regenerative braking is possible, as illustrated in FIG. 5. Consequently, the fuel efficiency of the vehicle may be enhanced.

FIG. 5 illustrates that the regenerative braking torque of the motor M is indicated as creep regenerative braking torque disposed at the uppermost position when the accumulated count of the reduction direction signal is 0, as first phase regenerative braking torque disposed therebelow when the accumulated count of the reduction direction signal is 1, as second phase regenerative braking torque when the accumulated count of the reduction direction signal is 2, and as third phase regenerative braking torque when the accumulated count of the reduction direction signal is 3.

For reference, the regenerative braking torque is torque opposite in direction to forward torque of the motor M for forward movement of the vehicle. Therefore, the regenerative braking torque is expressed as a negative value, and as the regenerative braking torque increases, the absolute value of the negative value is increased. Thus, the greater the regenerative braking torque, the lower the position of the graph of the regenerative braking torque.

In FIG. 5, as the vehicle speed increases, a line indicating the second phase regenerative braking torque and a line indicating the third phase regenerative braking torque are joined with each other and intended to move upward. The reason for this is because of the fact that, since the vehicle to which the present invention is applied is a hybrid vehicle rather than being a pure electric vehicle, the capacity of the motor is comparatively small, and thus the motor M having a small capacity cannot manage high regenerative braking torque under conditions in which the vehicle speed is comparatively high.

However, in an exemplary embodiment of the present invention, as described above, the accumulated count of the reduction direction signal is 2 or 3. Therefore, when the motor M generates the second phase regenerative braking torque or the third phase regenerative braking torque, the second gear shifting pattern is used as the gear shifting pattern for gear shifting. Thus, compared to the first phase using the first gear shifting pattern, the gear is shifted to a comparatively low gear stage at a comparatively high vehicle speed. Therefore, although the vehicle is comparatively high, the rotating speed that the motor M has to manage is comparatively reduced by a large shift ratio. Consequently, even at a comparatively high vehicle speed, the regenerative braking operation may be performed with large regenerative braking torque.

Furthermore, if the gear shifting is performed using the second gear shift pattern under conditions in which the second phase regenerative braking torque or the third phase regenerative braking torque is generated, a vehicle speed by which the second phase regenerative braking torque is distinguished from the third phase regenerative braking torque is increased from A to B indicated in FIG. 5. By the present speed section, a section in which a change in regenerative braking torque in a response to a phased increase requirement of the regenerative braking torque by the driver may be performed in phases to discern changes in deceleration of the vehicle may be increased.

In other words, when the vehicle speed is in a region below B of FIG. 5, since the second phase regenerative braking torque and the third phase regenerative braking torque are set to different values, when the second phase regenerative braking torque is converted into the third phase regenerative braking torque by a reduction direction signal by the driver, the driver can discern changes in deceleration of the vehicle in a response to his or her intention. However, when the vehicle speed is in a region over B, the second phase regenerative braking torque and the third phase regenerative braking torque are set to the same value due to limitation in capacity of the motor M, as described above. Thus, despite a reduction direction signal of the driver, there is no substantial change in deceleration, whereby the driver may feel that the intention of the driver is not properly reflected. In an exemplary embodiment of the present invention, as described above, the vehicle speed at which the second phase regenerative braking torque is distinguished from the third phase regenerative braking torque may be increased from A to B by use of the second gear shift pattern.

Of course, if the first gear shifting pattern is used under the above-mentioned conditions, the vehicle speed at which the second phase regenerative braking torque is distinguished from the third phase regenerative braking torque becomes A.

On the one hand, the two-way input device may be formed of the paddle shift, as described above. In the case where the driving mode of the vehicle is SPORTS Mode or the like which is a driving mode set to preferentially receive gear shifting requirement of the driver, the controller is configured to determine a reduction direction signal of the paddle shift as a down shift signal of the transmission TM and determines an increase direction signal as an up shift signal of the transmission TM so that it may be received as manual gear shifting requirement equal to that of the related art.

Figure 6:
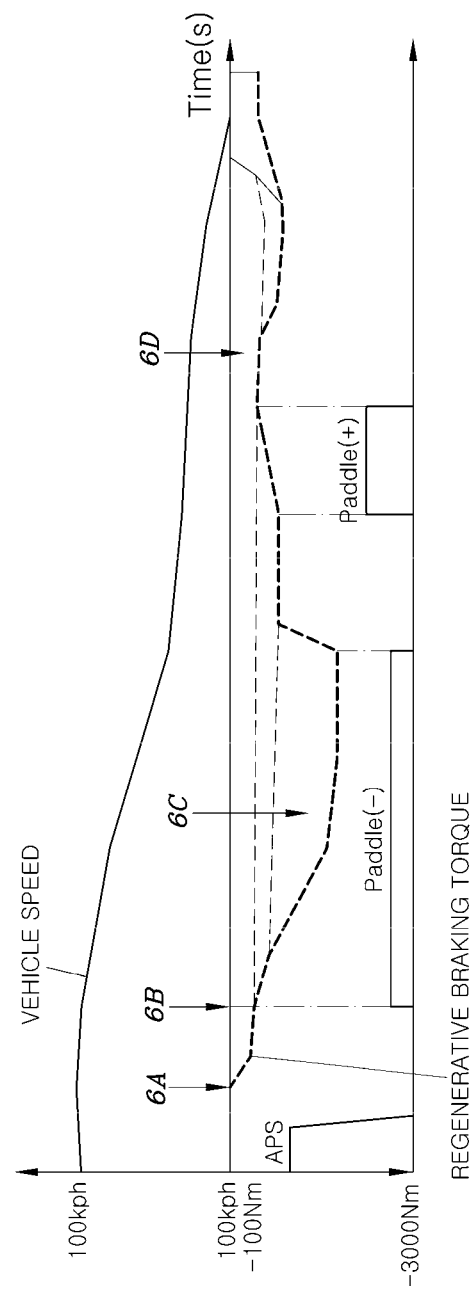
FIG. 6 is a graph for describing an example of driving conditions of the hybrid vehicle as a function of time, according to an exemplary embodiment of the present invention.

FIG. 6 is a graph for describing an example of driving conditions of the hybrid vehicle as a function of time, according to an exemplary embodiment of the present invention. When the driver releases the acceleration pedal at a vehicle speed of 100 kph and thus an APS signal is removed, since the vehicle speed is greater than the creep-regeneration reference speed (e.g., 10 kph), the controller begins to generate creep regenerative braking torque and starts a regenerative braking operation (refer to 6A of FIG. 6).

Thereafter, if the driver manipulates the two-way input device such as the paddle shift in a reducing direction thereof, the controller is configured to generate first phase regenerative braking torque of the corresponding vehicle speed with reference to a map such as that shown in FIG. 5 and thereby increases regenerative braking force (refer to 6B of FIG. 6).

During the above-mentioned regenerative braking operation, if the driver presses the brake pedal, mechanical braking force is added in a response to the pressing of the brake pedal, whereby the mechanical braking operation and the regenerative braking operation are simultaneously performed (refer to 6C of FIG. 6).

If the driver manipulates the two-way input device in an increasing direction while the driver releases the brake pedal, the controller removes the first phase regenerative braking torque and returns to the state of generating the creep regenerative braking torque, thus removing the control of the present invention.

Figure 7:
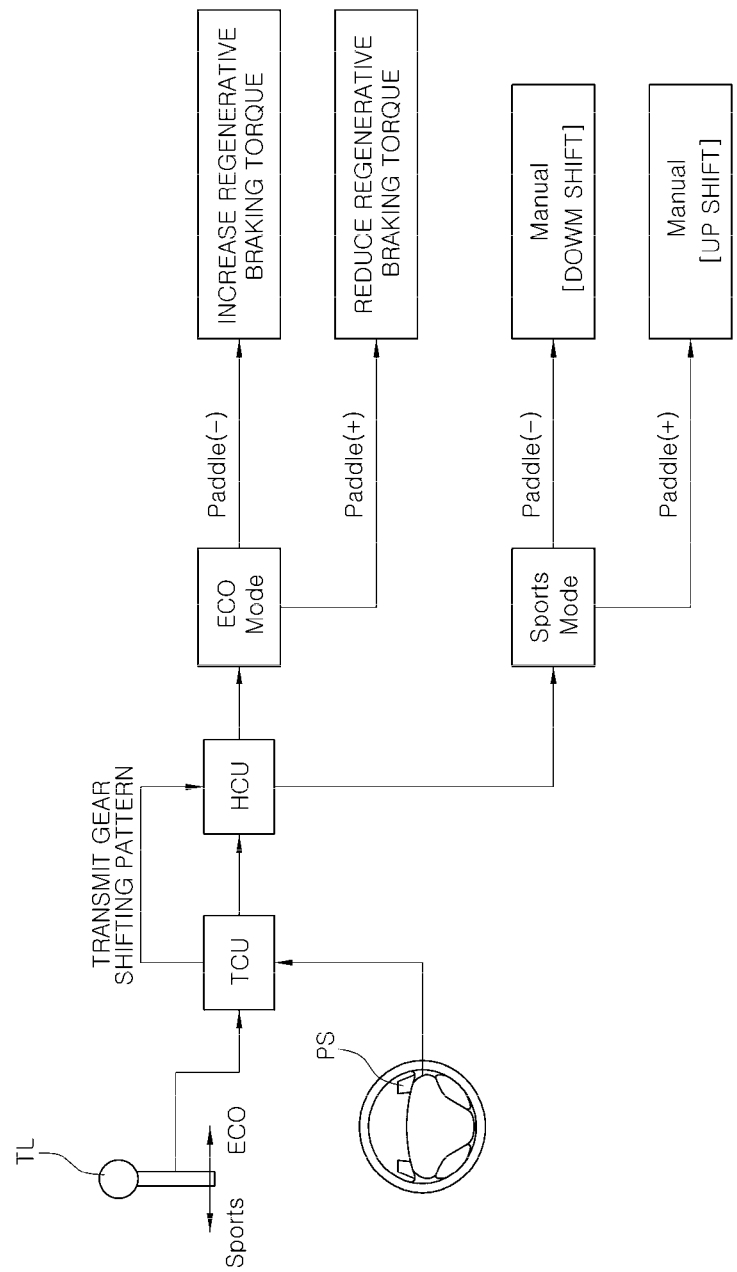
FIG. 7 is a block diagram illustrating the contents of the present invention.

FIG. 7 is a block diagram illustrating the contents of the present invention. The controller is divided into a Transmission Control Unit (TCU) and an HCU, and an economical (ECO) MODE or a SPORTS MODE may be selected by gearshift lever manipulation of the driver. If a paddle shift reduction or increase manipulation signal along with the gearshift lever manipulation signal is supplied to the TCU, the TCU transmits the received information and a gear shift pattern suitable for a current state to the HCU. In the case of the ECO MODE, the HCU increases or reduces regenerative braking torque of the motor M depending on whether the received signal of the paddle shift indicates an increase or a reduction. In the case of the SPORTS MODE, the HCU performs a manual up shift if the signal of the paddle shift indicates an increase, and performs a manual down shift if the signal of the paddle shift indicates a reduction.

As described above, a regenerative braking control method of a hybrid vehicle according to an exemplary embodiment of the present invention may control regenerative braking of a vehicle through a two-way input device even when the hybrid vehicle is under coasting conditions, embody phased changes of regenerative braking force corresponding to a control input of the two-way input device, and maximize a realizable regenerative braking rate, thus enhancing fuel efficiency of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A regenerative braking control method of a hybrid vehicle, the regenerative braking control method comprising:
    a vehicle condition determination operation of determining, by a controller, when a vehicle speed and a driving mode satisfy conditions for regenerative braking control of the hybrid vehicle;
    an accumulated count increasing operation of increasing, by the controller, an accumulated count of a reduction direction signal when the reduction direction signal is input from an input device while the conditions for the regenerative braking control are satisfied, or an accumulated count reducing operation of reducing, by the controller, the accumulated count of the reduction direction signal depending on a count of an increase direction signal when the increase direction signal is input from the input device while the conditions for the regenerative braking control are satisfied; and
    a phased braking operation of increasing, by the controller, regenerative braking torque of a motor in phases depending on the accumulated count of the reduction direction signal,
    wherein, when the phased braking operation is performed, the controller is configured to perform a gear shifting operation using different gear shifting patterns depending on the accumulated count of the reduction direction signal.

2. The regenerative braking control method according to claim 1,
    wherein the conditions for the regenerative braking control in the vehicle condition determination operation are satisfied when the vehicle speed is equal to or greater than a predetermined creep-regeneration reference speed and the driving mode is a fuel efficiency mode.

3. The regenerative braking control method according to claim 1,
    wherein, in the accumulated count increasing operation, the accumulated count of the reduction direction signal is increased to a predetermined maximum reference count, and the accumulated count of the reduction direction signal is after the accumulated count of the reduction direction signal reaches the predetermined maximum reference count, the accumulated count of the reduction direction signal is maintained at the predetermined maximum reference count.

4. The regenerative braking control method according to claim 3,
    wherein, in the accumulated count reducing operation, the accumulated count of the reduction direction signal is reduced to a predetermined minimum reference count, and the accumulated count of the reduction direction signal is after the accumulated count of the reduction direction signal reaches the predetermined minimum reference count, the accumulated count of the reduction direction signal is maintained at the predetermined minimum reference count.

5. The regenerative braking control method according to claim 4,
    wherein the predetermined minimum reference count is set to 0,
    wherein, in the phased braking operation, when the accumulated count of the reduction direction signal is a value of the predetermined minimum reference count+1, a first gear shifting pattern which is identical with a gear shifting pattern which is used when the accumulated count of the reduction direction signal is the predetermined minimum reference count is used, and
    wherein, when the accumulated count of the reduction direction signal is the predetermined maximum reference count or a value of the predetermined maximum reference count −1, a second gear shifting pattern different from the first gear shifting pattern is used in common.

6. The regenerative braking control method according to claim 5,
    wherein, in the second gear shifting pattern, the gear shifting operation between all gear stages is set such that down shifts are performed at vehicle speeds higher than vehicle speeds at which down shifts of the first gear shifting pattern are performed.

7. The regenerative braking control method according to claim 1,
    wherein, in the phased braking operation, the gear shifting operation is performed in a gear shifting pattern set such that, as the accumulated count of the reduction direction signal is increased, vehicle speeds at which down shifts are performed are increased.

8. The regenerative braking control method according to claim 5, wherein when the accumulated count of the reduction direction signal is 0, the regenerative braking torque of the motor is a creep regenerative braking torque.

9. The regenerative braking control method according to claim 1,
    wherein the input device includes a paddle shift.

10. The regenerative braking control method according to claim 1,
    wherein, when the driving mode of the vehicle is a mode set to receive gear shifting requirement of a driver, the controller is configured to determine the reduction direction signal of the input device as a down shift signal of a transmission and to determine the increase direction signal as an up shift signal of the transmission.

* * * * *